United States Patent [19]

Tamura et al.

[11] Patent Number: 5,365,458

[45] Date of Patent: Nov. 15, 1994

[54] MOTOR ECCENTRICITY MEASURING APPARATUS

[75] Inventors: Itaru Tamura, Kyoto; Akira Toyama, Joyo, both of Japan

[73] Assignee: Nippon Densan Corporation, Kyoto, Japan

[21] Appl. No.: 856,258

[22] Filed: Mar. 25, 1992

[30] Foreign Application Priority Data

Mar. 29, 1991 [JP] Japan .................................. 3-089077
Jul. 4, 1991 [JP] Japan .................................. 3-190867
Jul. 11, 1991 [JP] Japan .................................. 3-198549

[51] Int. Cl.$^5$ ............................................. G01B 21/20
[52] U.S. Cl. ..................................... 364/506; 364/560
[58] Field of Search ............... 364/506, 507, 559, 560, 364/561; 324/662, 679; 33/550; 360/77.02, 77.03, 77.04, 77.05

[56] References Cited

U.S. PATENT DOCUMENTS

| | | | |
|---|---|---|---|
| 3,986,380 | 10/1976 | Biggs | 72/76 |
| 4,135,244 | 1/1979 | Davis | 364/508 |
| 4,616,276 | 10/1986 | Workman | 360/77 |
| 4,896,228 | 1/1990 | Amakasu et al. | 360/77.08 |
| 4,941,105 | 7/1990 | Marangoni | 364/506 |
| 5,072,318 | 12/1991 | Yu | 360/77.02 |
| 5,140,534 | 8/1992 | Miller et al. | 364/560 |

*Primary Examiner*—Thomas G. Black
*Assistant Examiner*—Michael Zanelu

[57] ABSTRACT

A motor eccentricity measuring apparatus is provided comprising a detecting device for detecting a deflection of the rotating shaft of a motor, a first, a second, and a third hold device for holding detected values supplied from the detecting device, and an amplifier device for amplifying a difference between two outputs of the first and the second hold device. In operation, RRO is calculated, during a first measuring period, from the detected values of the first and third hold device and NRRO is calculated, during a second measuring period, from the detected values of the first and second hold device and simultaneously, amplified with the amplifier device.

11 Claims, 9 Drawing Sheets

Fig. 5-A
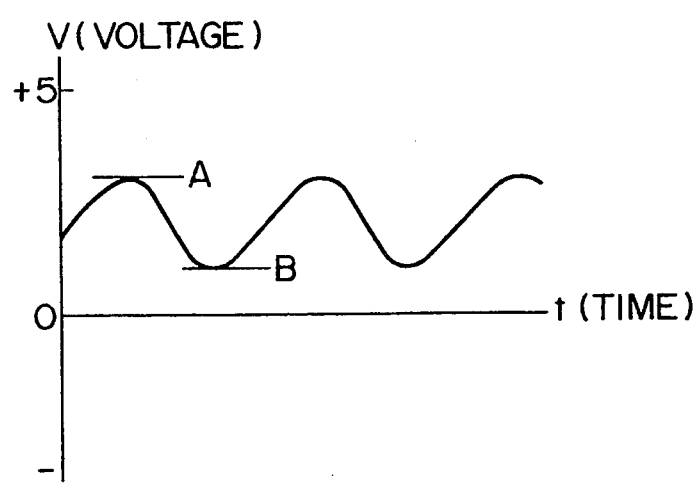
Fig. 5-B
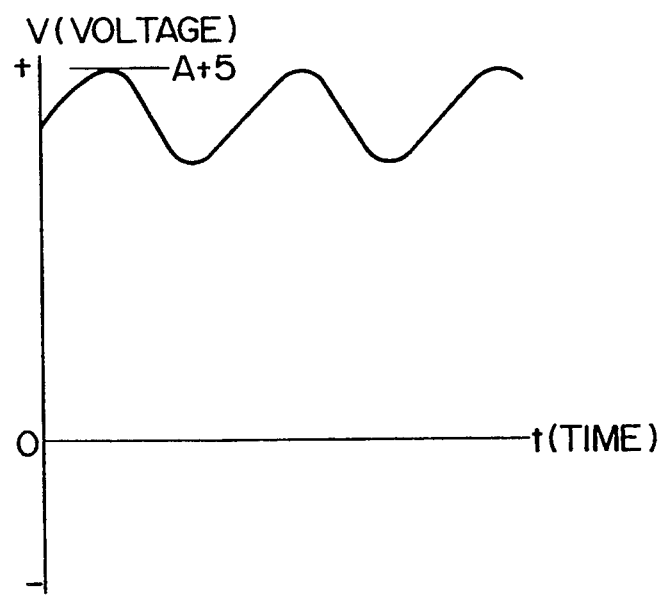

Fig. 6-A
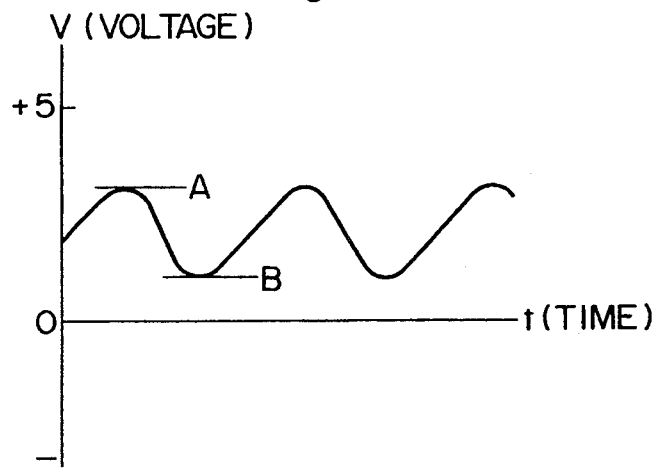
Fig. 6-B
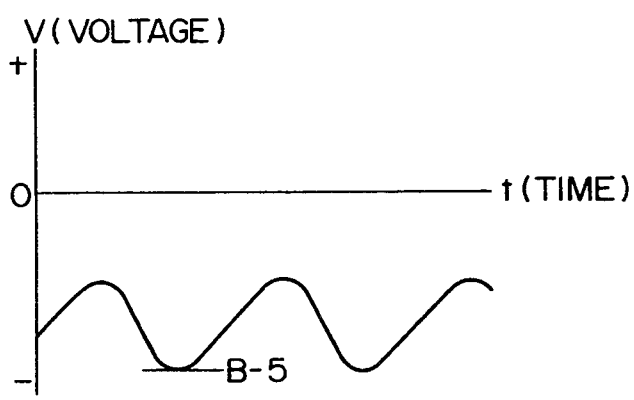
Fig. 6-C
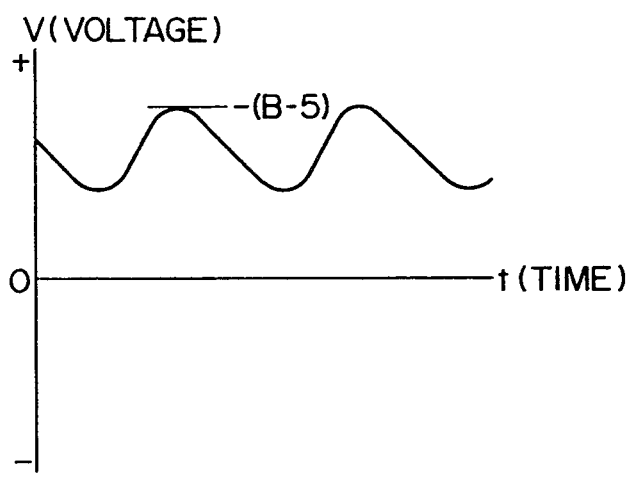

Fig. 7-A
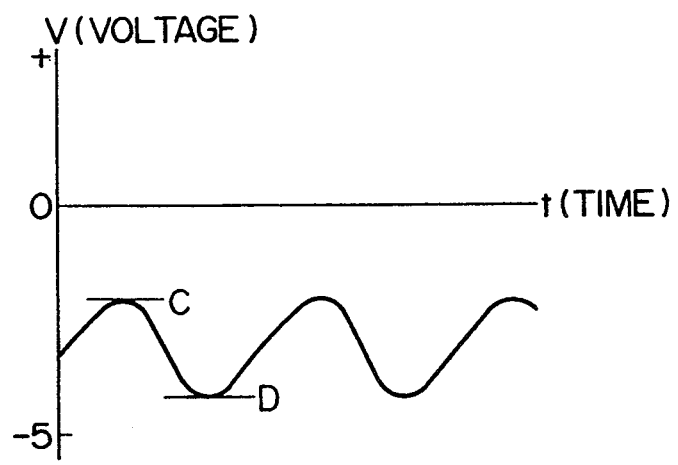
Fig. 7-B
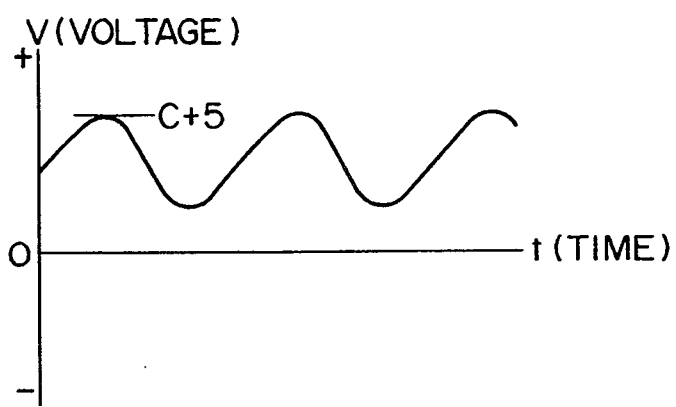

Fig. 8-A
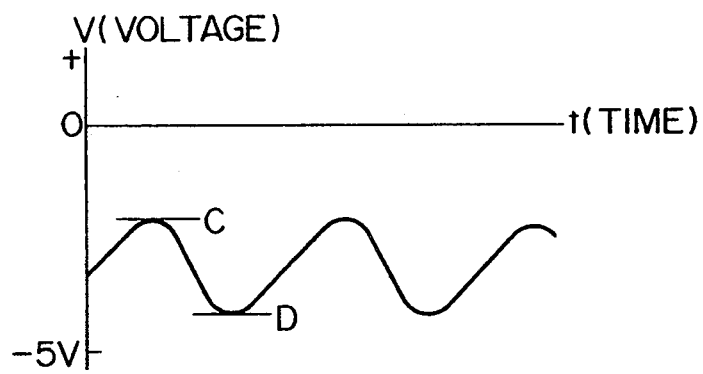
Fig. 8-B
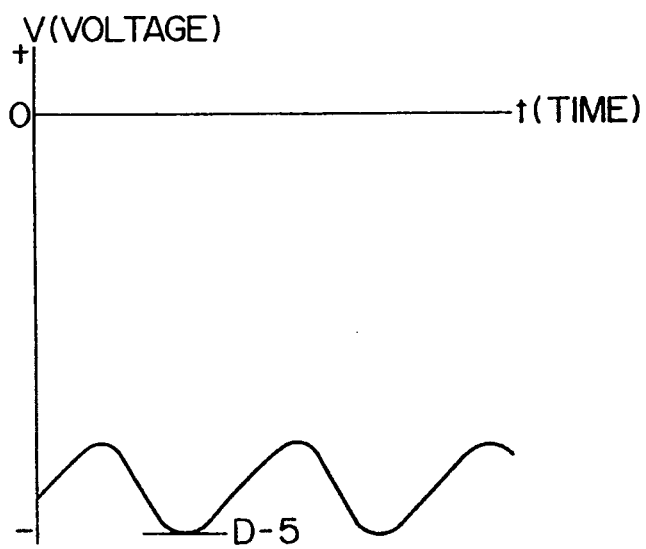
Fig. 8-C
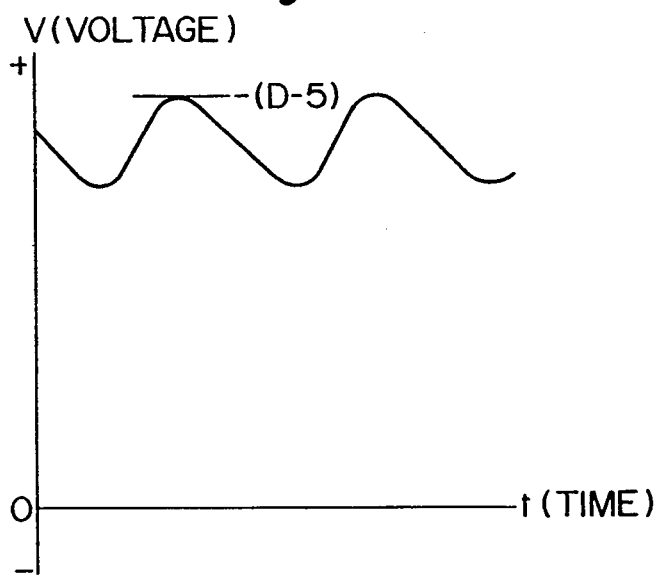

MOTOR ECCENTRICITY MEASURING APPARATUS

FIELD OF THE INVENTION

The present invention relates to a motor eccentricity measuring apparatus for measuring the eccentricity of a motor, e.g. a spindle motor for rotation of a magnetic disk.

DESCRIPTION OF THE PRIOR ART

A magnetic disk drive device is provided for actuating a spindle motor to rotate a magnetic recording medium or disk coated with a magnetic material and a magnetic head to read and write data on the disk. The magnetic disk is mounted by a hub or the like onto the rotating shaft of the spindle motor. It is essential for proper performance of the device to minimize the deflecting or eccentric movement of the motor shaft. If the motor shaft runs eccentric, the magnetic disk will be deflected during rotation, thus causing a physical collision with the magnetic head or an erratic accessing action.

It is known that the eccentric movement of the motor shaft includes repeatable runout, referred to as RRO hereinafter, and non-repeatable runout, referred to as NRRO.

RRO is a measure of the runout occuring in every revolution of the motor shaft which is off center or tilted. The RRO should be as small as several dozens of micrometers.

NRRO is also an off-center movement which appears irregularly as compared with constant RRO. NRRO results at random from injury or score on the surface or low roundness of a ball or roller of a bearing assembly or dimensional error of its housing. If an NRRO occurs, the read/write location on the magnetic disk is displaced and a desired data will hardly be retrieved. Thus, NRRO has to be eliminated and if occurs, it must stay as low as several hundredths of a millimeter.

A known RRO measuring method comprises detecting a peak value with a peak detecting circuit and a bottom value with a bottom detecting circuit, A/D converting the two values, and calculating a RRO through comparing the two values.

Also, NRRO is measured by peak holding a series of given lengths of the waveform at equal intervals and processing their A/D converted data.

As understood, simultaneous measurement of RRO and NRRO is much desired in which one single measuring station is involved and the steps of measuring procedure become less in number, and will thus be advantageous in cost.

However, NRRO is much smaller in the measured value (e.g. below 1/100) than RRO. If the input to an A/D converter is based on RRO measurements, NRRO will be declined in the resolution and hardly be identified. If the input to the A/D converter is based on NRRO measurements, RRO will be expressed by a too large number.

For this reason, RRO and NRRO have to be measured separately in a conventional method.

SUMMARY OF THE INVENTION

It is an object of the present invention to provide a motor eccentricity measuring apparatus capable of measuring both RRO and NRRO simultaneously with accuracy.

It is another object of the present invention to provide a motor eccentricity measuring apparatus capable of measuring RRO at accuracy with the use of a relatively simple arrangement.

Other objects and features of the present invention will be apparent from the following description.

BRIEF DESCRIPTION OF THE DRAWINGS

FIGS. 5-A and 5-B are diagrams showing an input signal and an output signal of a first shift means respectively when the input signal is positive;

FIGS. 6-A, 6-B, and 6-C are diagrams showing an input and an output signal of a second shift means and an output signal of a polarity inverse means respectively when the input signal of the second shift means is positive;

FIGS. 7-A and 7-B are diagrams showing an input signal and an output signal of the first shift means respectively when the input signal is negative;

FIGS. 8-A, 8-B, and 8-C are diagrams showing an input and an output signal of the second shift means and an output signal of the polarity inverse means respectively when the input signal of the second shift means is negative.

DETAILED DESCRIPTION OF THE PREFERRED EMBODIMENTS

A motor eccentricity measuring apparatus according to a first embodiment of the present invention will be described referring to FIGS. 1 and 2.

Figure 1:
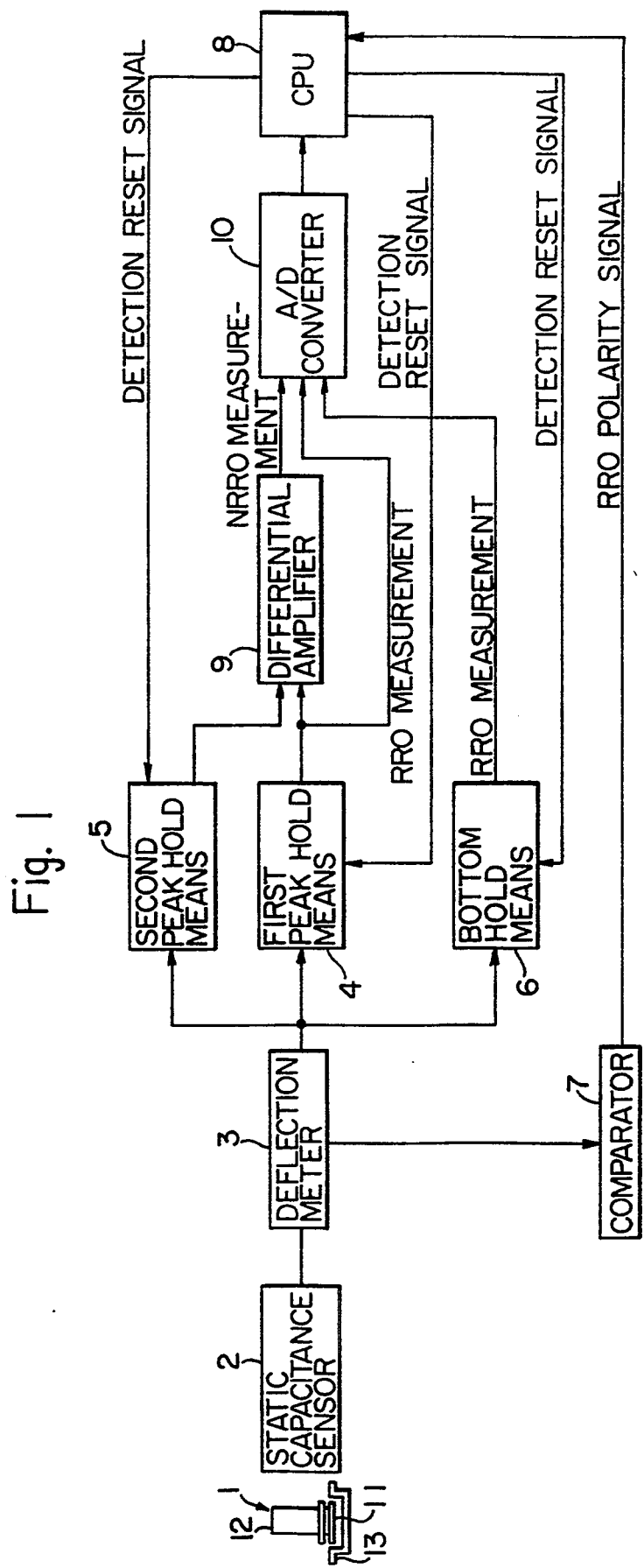
FIG. 1 is a schematic explanatory view of a motor eccentricity measuring apparatus showing a primary embodiment of the present invention.
Figure 2:
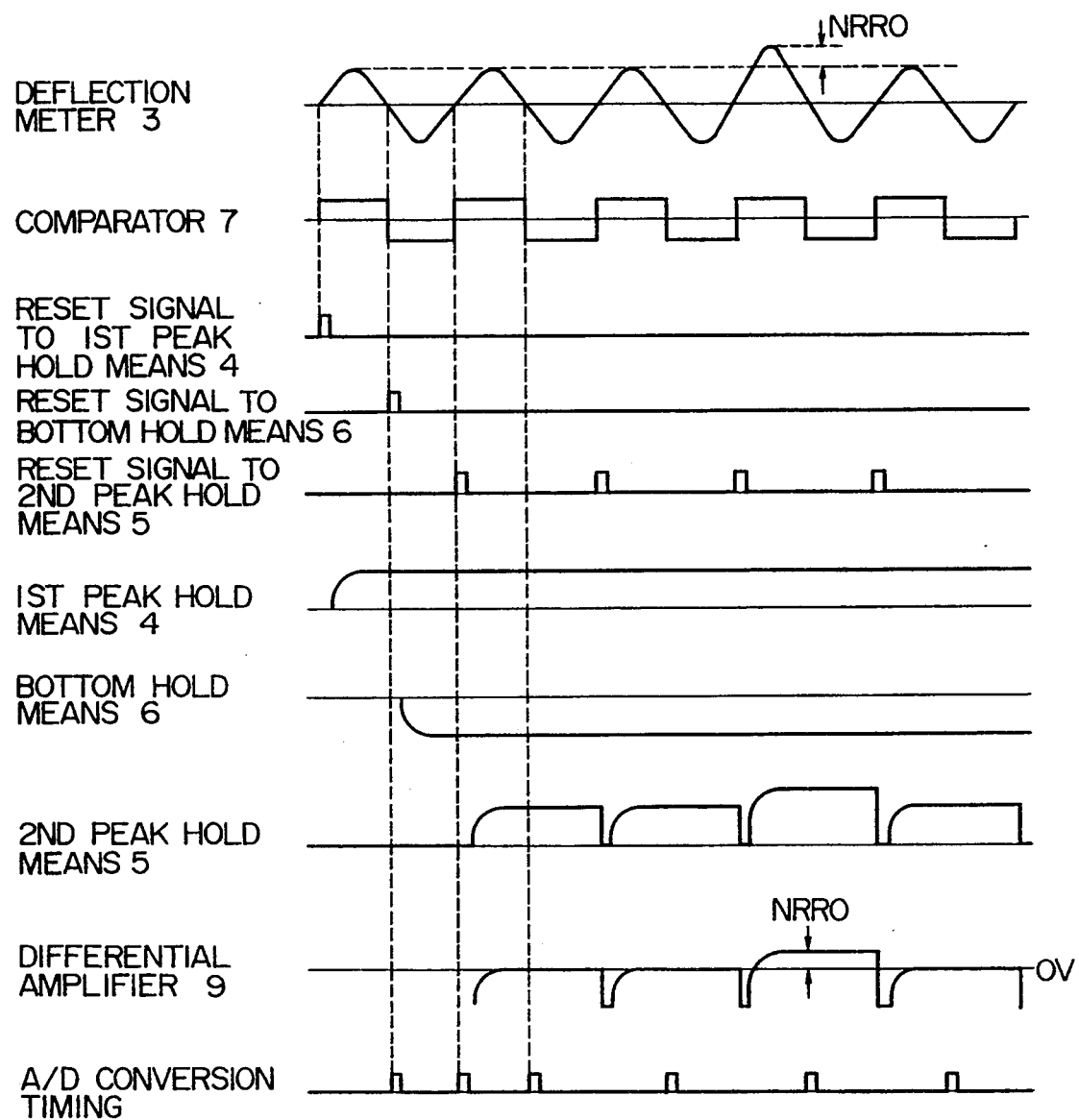
FIG. 2 is a timing chart showing the action of measuring RRO and NRRO in the motor eccentricity measuring apparatus shown in FIG.1.

As shown in FIG. 1, a spindle motor 1 to be examined is provided with a bracket 11 and a hub 12 arranged for rotation relative to the bracket 11. Also, a bearing member (not shown) is mounted on the bracket 11 so that it can rotate together with the hub 12. The hub 12 is coupled to a recording medium, e.g. a magnetic disk, by a known manner.

First, the spindle motor 1 which has fully been assembled is carried on a transfer table 13 to a measuring station where a static capacitance sensor 2 is installed for measurement of a distance to the hub 12 of the motor 1. The sensor 2 is arranged for detecting a change in the distance to the surface of the hub 12 and translating it to a capacitance variation which is then delivered as a voltage output of measurement to a deflection meter 3.

The deflection meter 3 calculates a shaft runout of the motor from the voltage measurement of the static capacitance sensor 2 and then, transfers it to two, first and second, peak hold means 4 and 5 and a bottom hold means 6. Also, a comparator 7 is provided for producing a square wave corresponding to a deflecting direction signal of the deflection meter 3 and transmitting it to a CPU 8 which may be a microprocessor. In response to the square wave of the comparator 7, the CPU 8 delivers a detect/reset signal to the two peak hold means 4 and 5 and to the bottom hold means 6. The two peak hold means 4,5 upon receiving the detect/reset signal hold the peak values of the runout supplied from the deflection meter 3. Similarly, the bottom hold means 6 holds the bottom value of the runout.

A differential amplifier 9 amplifies a difference value calculated by subtracting the peak value of the first peak hold means 4 from the peak value of the second hold means 5 and transfers its analog form to an A/D converter 10. The A/D converter 10 converts the three analog outputs of the first peak hold means 4, the bottom hold means 6, and the differential amplifier 9 to their digital forms and feeds them to the CPU 8. Accordingly, the CPU 8 samples deflection values at the timing determined by the square wave of the comparator 7 for calculation of RRO and NRRO, as described below.

The calculation of RRO and NRRO will now be described in more detail referring to FIG. 2. According to the embodiment, RRO is calculated from the deflection values at a first period (which is thus referred to as a first measuring period) and NRRO is calculated from the other deflection values at a second period (which is referred to as a second measuring period).

The action of calculating RRO will first be explained.

The comparator 7 produces an H signal when the output of the deflection meter is positive and an L signal when it is negative. At the first rise of a square-wave or pulse signal of the comparator 7, the first peak hold means 4 is activated for resetting and thus, holds a succeeding peak value from the deflection meter 3. Also, at the first decay of the pulse signal of the comparator 7, the bottom hold means 6 is activated for resetting and holds a succeeding bottom value from the deflection meter 3. The two, peak and bottom, values are transferred to the A/D converter 10 where the peak value is converted to a digital value at the first decay of the signal of the comparator 7 and the bottom value is converted to a digital value at the second rise of the signal of the comparator 7. The digital values are then fed to the CPU 8 where a difference between the two values is calculated to an RRO measurement. In the embodiment, the two, peak and bottom, values remain held until the measuring action is completed and the peak value is used as a reference peak value in calculation of NRRO.

The action of calculating NRRO will be explained.

At each rise of the pulse signal of the comparator 7 after the first rise, the second peak hold means 5 is activated for resetting and holds the-peal value of the corresponding period. The peak value of the second peak hold means 5 is transferred to the differential amplifier 9 where it is compared with the reference peak value determined at the RRO calculating procedure and supplied from the first peak hold means 4 to find a difference which is then amplified. The amplified difference value of analog form is fed to the A/D converter 10. It is now understood that the difference value from the differential amplifier 9 is an NRRO measurement representing the highest of the outputs of the deflection meter 3.

The A/D converter 10 converts at each decay of the signal of the comparator 7 after the first decay the analog difference value to its digital form which is then transferred to the CPU 8. The CPU 8 calculates an average of the digital difference values for output as an NRRO measurement. More particularly, NRRO is measured at each period (a sub-period) after the first period by the foregoing manner and after measurement for a predetermined number (preferably, 50) of the sub-periods, the average of NRRO is calculated from the measured values of the sub-periods and determined as an NRRO measurement of the motor.

The NRRO values detected by the first 4 and the second peak hold means 5 are much smaller than the RRO values. For compensation, the NRRO values are amplified (e.g. about 100 times, considering RRO/NRRO) so that they are equivalent in the minimum resolution at the A/D converter 10 to the RRO values. This enables the A/D converter 10 designed for resolution of RRO to differentiate the NRRO values with equal resolution.

Figure 3:
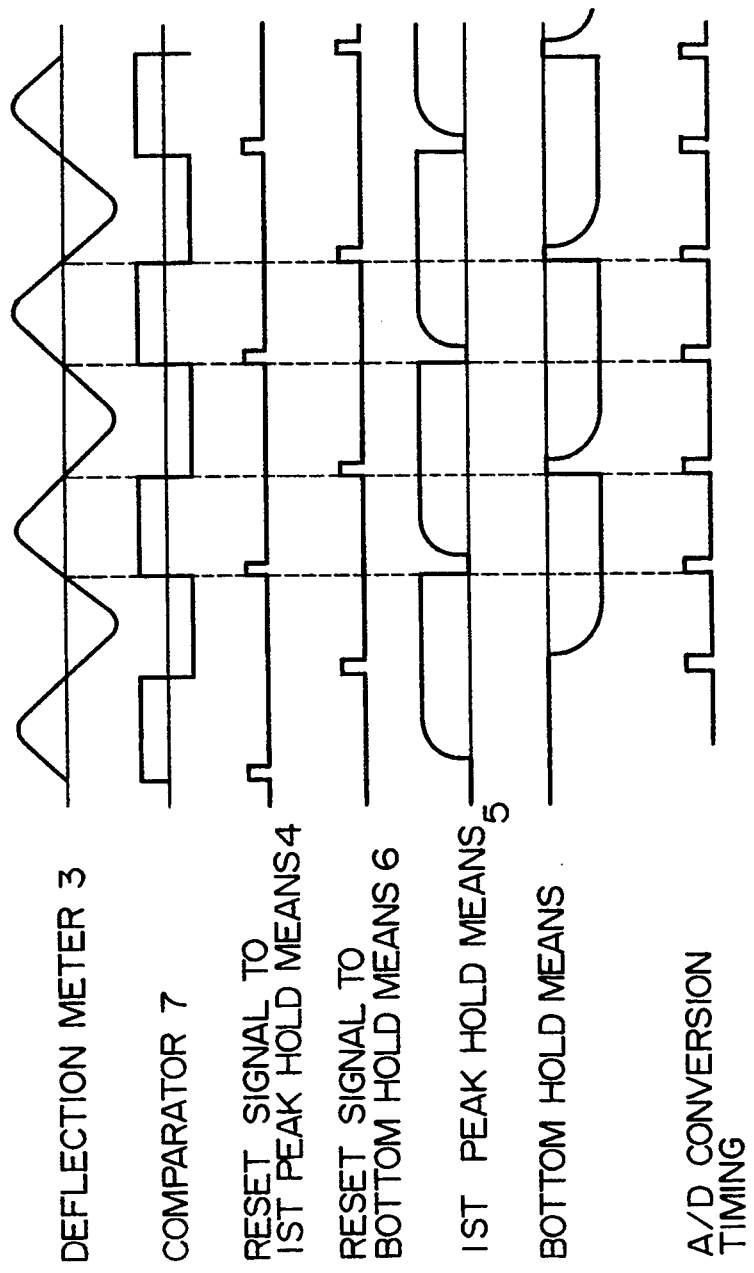
FIG. 3 is a timing chart showing the detection of a plurality of RRO values.

Although RRO is measured one time from a first period value of the deflection meter 3 in the embodiment, the average of RRO can be calculated from more than one of measured values. For example, it is arranged as shown in the timing chart of FIG. 3 that the first peak hold means 4 is activated for resetting at each rise of the signal of the comparator 7 and holds a succeeding peak value from the deflection meter 3. Also, at each decay of the signal of the comparator 7, the bottom peak hold means 6 is activated for resetting and holds a succeeding bottom value from the deflection meter 3. The two, peak and bottom, values are fed to the A/D converter 10 where the peak value is converted to its digital form by the decay of the pulse signal of the comparator 7 and the bottom value is converted to its digital form by the rise of the same signal. The two, peak and bottom, digital values are then transferred to the CPU 8 where a difference between the peak value and the bottom value at each period (a sub-period) is calculated to a RRO measurement of the sub-period and the average is also reckoned from a series of the RRO measurements. As a result, the RRO measurement will be obtained with more accuracy.

The RRO and NRRO values are carried on two different frequency signals of the deflection meter 3 respectively according to the embodiment. It is also a good idea to carry RRO and NRRO alternately at different periods of time. For example, RRO is measured at a first one-second duration and NRRO is measured at a second one-second duration.

Although the second peak hold means 5 is used together with the first peak hold means 4 for measurement of NRRO in the embodiment, it may be replaced with an additional bottom hold means. In action, while a reference bottom value is determined and held by the bottom hold means 6, a bottom value at each sub-period is detected and held by the additional bottom hold means. Then, NRRO will be calculated through comparing the reference bottom value of the bottom hold means 6 with the bottom value of the additional bottom hold means.

RRO of a motor will also be measured accurately with the use of another motor eccentricity measuring apparatus which is more simple in the arrangement.

Figure 4:
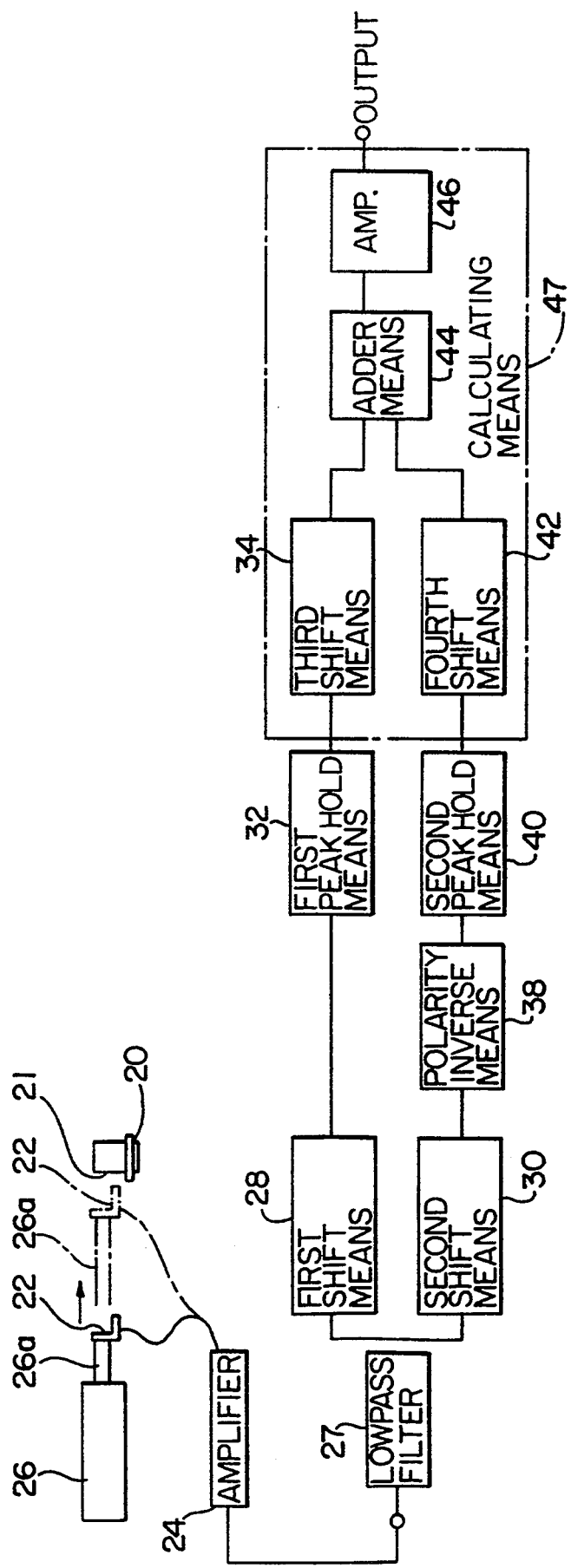
FIG. 4 is a schematic explanatory view for measurement of RRO showing another embodiment of the present invention.

Such a motor eccentricity measuring apparatus is illustrated in FIG. 4 having a static capacitance sensor 22 and an amplifier 24 which act in combination as a detecting means. The sensor 22 is mounted to a cylinder rod 26a of a pneumatic cylinder 26 which can move forward from the retracting or backward position denoted by the real line in FIG.4 to the measuring position denoted by the two-dot chain line. In measurement of RRO, the sensor 22 on the cylinder rod 26a is thus moved forward and comes to the measuring position adjacent to a hub 21 of a spindle motor 20 to be examined. A detection voltage output of the sensor 22 is then amplified by the amplifier 24.

The detection voltage after amplified by the amplifier 24 is fed through a lowpass filter 27 to a first 28 and a second shift means 30 which can perform e.g. +5 V and −5 V shift actions respectively.

An output of the first shift means 28 is transmitted to a first peak hold means 32 for holding a peak voltage and the peak voltage is fed to a third shift means 34 arranged for e.g. −5 V shift.

Also, an output of the second shift means 30 is transmitted to a polarity inverse means 38 for inversion of the polarity. The polarity inversion may be executed along with −5 V shift action. An inverted output of the polarity inverse means 38 is fed to a second peak hold means 40 for holding a peak voltage and the peak voltage is sent to a fourth shift means 42 arranged for e.g. −5 V shift.

Two outputs from the third 34 and the fourth shift means 42 are summed by an adder means 44 to a sum voltage signal which is then amplified e.g. ten times by an amplifier 46. Both the summing and the amplification may be carried out at one time. This embodiment allows the third shift means 34, the fourth shift means 42, the adder means 44, and the amplifier 46 to constitute a calculating means 47.

Each of the first shift means 28, the second shift means 30, the polarity inverse means 38, the third shift means 34, the fourth shift means 42, the adder means 44, and the amplifier 46 can be constructed by a known circuitry arrangement containing an operating amplifier. The first peak hold means 32 and the second peak hold means 40 can be fabricated using commercially available peak hold ICs.

During rotation of the spindle motor 20, the sensor 22 on the rod 26a of the pneumatic cylinder 26 which has been advanced and remains at the measuring position, is maintained at a constant distance from the hub 21 of the motor 20. A measured voltage of the sensor 22 is amplified by the amplifier 24 and filtered by the lowpass filter 27.

The waveform of the amplified voltage of the amplifier 24 contains two, maximum and minimum, values in three different patterns; both A[V] and B[V] appear in a positive region as shown in FIGS. 5-A and 6-A, both C[V] and D[V] appear in a negative region as shown in FIGS. 7-a and 8-A, and the maximum is positive while the minimum is negative. This results from different setting of the distance between a detector portion of the sensor 22 and the outer surface of the hub 21 of the spindle motor 20 which is determined with the pneumatic cylinder 26 so that the output waveform of the amplifier 24 can swing within an amplitude range between +5 V and −5 V.

If the waveform is as shown in FIG. 5-A (where both the maximum A and the minimum B are positive), it is shifted to as shown in FIG. 5-B by the first shift means 28.

The peak voltage of the waveform is hence held at (A+5) V by the first peak hold means 32 and then, shifted back to A volts by the third shift means 34.

The waveform shown in FIG. 6-A (similar to FIG. 5-A) is shifted down by the second shift means 30 to a state shown in FIG .6-B. The waveform of FIG. 6-A remains within a range of ±5 volts and will appear in the negative region after shifting action of the second shift means 30. The negative waveform is then inverted by the polarity inverse means 38 thus becoming positive. A peak value of the resultant positive waveform is held by the second peak hold means 40 at −B+5 V which is of course a positive value. The peak voltage of −B+5 is then shifted by the fourth shift means 42 to −B V.

The two voltages A and −B are summed by the adder means 44 to A−B V which is then 10× amplified by the amplifier means 46 to 10×(A−B).

Similarly, if the waveform is as shown in FIG. 7-A (where both the maximum C and the minimum D are negative), it becomes as shown in FIG. 7-B after passing the first shift means 28. The peak voltage of the waveform is then held at (C+5) V by the first peak hold means 32. The waveform of FIG. 7-A remains within a range of ±5 volts and will thus appear in the positive region after shifting action of the first shift means 28. The peak voltage C+5 is shifted again by the third shift means 34 to C volts.

Also, the waveform shown in FIG. 8-A (similar to FIG. 7-A) is shifted down by the second shift means 30 to a state shown in FIG. 8-B. This negative state is then inverted by the polarity inverse means 38 thus becoming positive. A peak value of the resultant positive waveform is held by the second peak hold means 40 at −D+5 V which is of course a positive value. The peak voltage of −D+5 is then shifted by the fourth shift means 42 to −D V.

The two voltages C and −D are summed by the adder means 44 to C−D V which is then 10× amplified by the amplifier means 46 to 10×(C−D).

As understood, the output of the amplifier 24 can constantly be detected its peak value of positive form by the action of the first and second peak hold means 32,40 at accuracy, regardless of the state of its waveform e.g. when the maximum is positive and the minimum is negative. Also, the detected peak value is as a high voltage as 10×(maximum−minimum).

The voltage 10×(maximum−minimum) represents a difference between the greatest and the smallest of the distance between the detector portion of the sensor 22 and the outer surface of the hub 21 of the spindle motor 20 to be examined. Accordingly, a deflection or RRO of the rotating shaft of the spindle motor 20 will be measured.

The pneumatic cylinder 26 may be replaced with a stepping motor for precision movement of the sensor 22.

Figure 9:
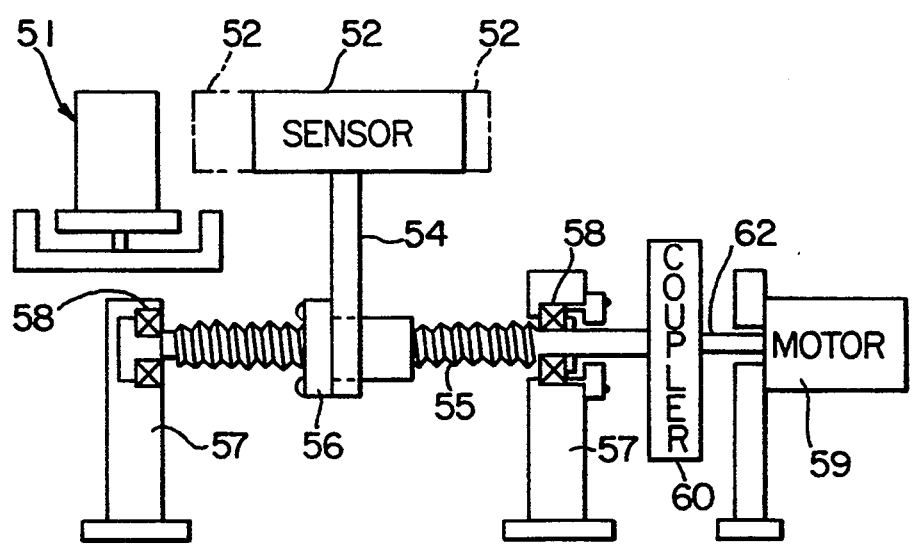
FIG. 9 is a schematic view showing a mechanism of installation of a sensor.

As shown in FIG. 9, a sensor 52 is fixedly mounted to a sensor mounting base 54 which is secured to a flange 56 on a ball screw 55. The ball screw 55 is rotatably supported by a pair of bearings 58,58 mounted on two supports 57,57 respectively. Also, the ball screw 55 is coupled at one end by a coupler means 60 to the output shaft 62 of a stepping motor 59. As the stepping motor 59 operates, the ball screw 55 rotates simultaneously. The ball screw 55 of the embodiment has a lead pitch of 2 mm and the stepping motor 59 is arranged for performing one full revolution in every 200 pulses of a signal.

When the motor 59 rotates in a given direction, the sensor 52 travels from the backward position denoted by the one-dot chain line of FIG. 9 through an intermediate position denoted by the real line to the measuring position denoted by the two-dot chain line. In operation, the sensor 52 is examined whether it is in enable state or not during its movement from the rearward position to the intermediate position.

More particularly, as the stepping motor 59 is rotated through an angle (of 360/200 degrees) by energization of one pulse, the sensor 52 moves 1 μm towards a spindle motor 51 to be examined. It is now assumed that the distance between the backward position and the intermediate position of the sensor 52 is 50 μm. When five pulses are fed to the stepping motor 59, its corresponding rotation of the stepping motor 59 actuates the sensor 52 to move 50 μm towards the measuring position. At the time, an output signal of the sensor 52 representing the movement from the rearward position to the intermediate position is examined through arithmetic processing whether it is equivalent to 50 μm or not. If the signal is equivalent to 50 μm, a given pulse signal is fed to the stepping motor 59 for further movement of the sensor 52 up to the measuring position where measurement of RRO is carried out. If not, the stepping motor 59 is deenergized and the measurement of RRO with the sensor 52 is canceled. It is desirable that such an erratic movement of the sensor 52 is clearly indicated by illumination of a lamp (not shown).

It would be understood that the present invention is not limited to the motor eccentric measuring apparatuses of the embodiments above described. Other changes and modifications will be possible without departing from the scope and spirit of the present invention.

We claim:

1. A method of measuring motor eccentricity using a measuring apparatus comprising a detecting means for detecting a deflection of a rotating shaft of a motor, a first, a second, and a third hold means each for holding detected values supplied from the detecting means, an amplifier means for amplifying a difference between outputs of said first and said second hold means, and a processing means for performing timing operations and calculations, the procedure comprising the steps of:

measuring a degree of repeatable runout (RRO), during a first measuring period, from the detected values of said first and third hold means;

measuring a degree of non-repeatable runout (NRRO), during a second measuring period, from the detected values of said first and said second hold means; and amplifying a difference between NRRO and RRO during said second measuring period.

2. A method according to claim 1, wherein:

the step of measuring a degree of RRO comprises subtracting a reference bottom value of the deflection of the shaft of the motor which has been held by said third hold means from a reference peak value of the deflection of the shaft of the motor which has been held by said first hold means; and the step of measuring a degree of NRRO comprises subtracting the reference peak value determined by said first hold means from a peak value of the deflection of the shaft of the motor which has been held by said second hold means.

3. A method according to claim 1, wherein:

the step of measuring a degree of RRO comprises subtracting a reference bottom value of the deflection of the shaft of the motor which has been held by said first hold means from a reference peak value of the deflection of the shaft of the motor which has been held by said third hold means; and the step of measuring a degree of NRRO comprises subtracting the reference bottom value determined by said first hold means from a peak bottom value of the deflection of the shaft of the motor which has been held said second hold means.

4. A method according to claim 1, wherein the step of measuring RRO, during a first measuring period, includes a plurality of first sub-periods, each of said first sub periods comprising the step of:

measuring an RRO from the detected values of said first and third hold means in order to obtain the average of RRO's over a plurality of first sub-periods.

5. A method according to claim 1, wherein the step of measuring NRRO, during a second measuring period, includes a plurality of second sub-periods, each of said second sub periods comprising the step of:

measuring an NRRO from the detected values of said first and second hold means in order to obtain the average of NRRO's over a plurality of second sub-periods.

6. A method according to claim 1, wherein said detecting means is a static capacitance sensor.

7. A motor eccentricity measuring apparatus comprising:

detecting means for detecting a deflection of the rotating shaft of a motor;

first shift means for shifting-up a detected value of said detecting means to a given positive level;

first peak hold means for holding the peak of the detected value shifted up by said first shift means;

second shift means for shifting-down the detected value of said detecting means to a given negative level;

polarity inverting means for inverting the polarity of the detected value shifted down by said second shift means;

second peak hold means for holding the peak of the detected value polarity inverted by said polarity inverting means; and calculating means for calculating repeatable runout (RRO) from the peak values held by said first and second peak hold means.

8. A motor eccentricity measuring apparatus according to claim 7, a third shift means for shifting-down the value held by said first peak hold means to a given level;

a fourth shift means for shifting-down the value held by said second peak hold means to a given level; and an adder means for summing the two shifted level values of said third and fourth shift means.

9. A motor eccentricity measuring apparatus according to claim 7, wherein said detecting means is arranged for movement between a measuring position adjacent to the motor to be examined and a backward position distanced backward from the measuring position so that it can be located at the measuring position for measurement of a deflection of the rotating shaft of the motor.

10. A motor eccentricity measuring apparatus according to claim 9, wherein an intermediate position is provided between the measuring position and the backward position for examining whether said detecting means is in an enable state or not when having been moved from the backward position to the intermediate position.

11. A motor eccentricity measuring apparatus according to claim 7, wherein said detecting means is a static capacitance sensor.

* * * * *